United States Patent [19]

Takeo

[11] Patent Number: 5,068,907

[45] Date of Patent: Nov. 26, 1991

[54] METHOD OF RECOGNIZING IRRADIATION FIELD

[75] Inventor: Hideya Takeo, Kanagawa, Japan

[73] Assignee: Fuji Photo Film Co., Ltd., Kanagawa, Japan

[21] Appl. No.: 414,351

[22] Filed: Sep. 29, 1989

[30] Foreign Application Priority Data

Oct. 4, 1988 [JP] Japan ................... 63-250335

[51] Int. Cl.$^5$ ................................. G06K 9/00
[52] U.S. Cl. ................................. 382/48; 358/453; 364/413.3; 382/6; 382/9
[58] Field of Search ............... 382/48, 9, 6, 22; 250/327.2; 358/449, 453; 364/413.13, 413.15; 378/13, 20

[56] References Cited

U.S. PATENT DOCUMENTS

| | | | |
|---|---|---|---|
| 4,206,442 | 6/1980 | Miyazaki et al. | 382/9 |
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |
| 4,527,060 | 7/1985 | Suzuki et al. | 250/327.2 |
| 4,528,692 | 7/1985 | Umeda et al. | 382/9 |
| 4,682,028 | 7/1987 | Tanaka et al. | 250/327.2 |

FOREIGN PATENT DOCUMENTS 56-11395 2/1981 Japan.
61-5193 2/1986 Japan.

Primary Examiner—Leo H. Boudreau
Attorney, Agent, or Firm—Sughrue, Mion, Zinn Macpeak & Seas

[57] ABSTRACT

After many image signal components representing a radiation image are obtained from a recording medium on which the radiation image has been recorded in the region inside of an irradiation field, contour points of the irradiation field are detected at the intersections of each radial line of a group of radial lines, which extend from a predetermined point inside of the irradiation field to edges of the recording medium, and the contour of the irradiation field. The contour point is detected on the basis of image signal components which correspond to picture elements arrayed along each line. In cases where a predetermined number of the contour points consecutively arrayed along the contour, which number is not smaller than three, are present on a single straight line, each of the extreme contour points on the single straight line is shifted to the intersection of the single straight line and a straight line, on which a contour point adjacent to each extreme contour point and not present on the single straight line, lies and which straight line intersects normal to the single straight line. The region surrounded by lines connecting the thus found contour points is detected as the irradiation field.

1 Claim, 4 Drawing Sheets

METHOD OF RECOGNIZING IRRADIATION FIELD

BACKGROUND OF THE INVENTION

1. Field of the Invention

This invention relates to a method for determining the shape and location of an irradiation field wherein the shape and location of an irradiation field on a recording medium, on which a radiation image has been recorded in the region inside of the irradiation field, are determined on the basis of an image signal comprising a plurality of image signal components corresponding to picture elements located on the recording medium.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value designed for the type of image processing to be carried out, the X-ray image is read out from the X-ray film and converted into an electric signal, and the electric signal (image signal) is processed and then used to reproduce the X-ray image as a visible image on a copy photograph or the like. In this manner, a visible image having good image quality with high contrast, high sharpness, high graininess or the like can be reproduced. Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during its exposure to the radiation. A phosphor exhibiting such properties is referred to as a stimulable phosphor. As disclosed in Japanese Unexamined Patent Publication Nos. 55(1980)-12429, 56(1981)-11395, 55(1980)-163472, 56(1981)-104645, and 55(1980)-116340, it has been proposed to use stimulable phosphors in radiation image recording and reproducing systems. Specifically, a sheet provided with a layer of the stimulable phosphor (hereinafter referred to as a stimulable phosphor sheet is first exposed to radiation, which has passed through an object such as a human body, in order to cause a radiation image of the object to be stored thereon, and is then scanned with stimulating rays, such as a laser beam, which cause it to emit light in proportion to the amount of energy stored during its exposure to the radiation. The light emitted by the stimulable phosphor sheet upon stimulation thereof is photoelectrically detected and converted into an electric image signal, and the image signal is used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation, to which the stimulable phosphor sheet is exposed, varies over a wide range. More specifically, since the amount of light emitted upon stimulation after the radiation energy is stored on the stimulable phosphor varies over a wide range and is proportional to the amount of energy stored during exposure to the radiation, it is possible to obtain an image having a desirable density regardless of the energy intensity of the radiation to which the stimulable phosphor sheet was exposed. In order to obtain a desirable image density, an appropriate read-out gain is set when the emitted light is being detected with a photoelectric read-out means and converted into an electric signal to be used in the reproduction of a visible image on a recording material, such as photographic film, or a display device such as a CRT.

In order to detect an image signal accurately, certain factors which affect the image signal must be set in accordance with the dose of radiation delivered to the stimulable phosphor sheet and the like. A novel radiation image recording and reproducing system which accurately detects an image signal has been proposed in, for example, Japanese Unexamined Patent Publication Nos. 58(1983)-67240, 58(1983)-67241 and 58(1983)-67242. The proposed radiation image recording and reproducing system is constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal. The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed. Regardless of whether a preliminary readout is or is not carried out, it has also been proposed to analyze the image signal (including the preliminary read-out image signal) obtained and to adjust image processing conditions, which are to be used when the image signal is processed, on the basis of the results of an analysis of the image signal. The proposed method is applicable to cases where an image signal is obtained from a radiation image recorded on a recording medium such as conventional X-ray film, as well as to systems using stimulable phosphor sheets.

Various methods have been proposed for calculating how the read-out conditions for the final readout and/or the image processing conditions should be adjusted on the basis of an analysis of the image signal (including the preliminary read-out image signal). As one of such methods, it has been proposed in, for example, Japanese Patent Application No. 59(1984)-12658 to create a histogram of the image signal. When a histogram of an image signal is created, the characteristics of the corresponding radiation image recorded on a recording medium such as a stimulable phosphor sheet or X-ray film can be ascertained based on, for example, the maximum value of the image signal, the minimum value of the image signal, or the value of the image signal at which the histogram is maximum, i.e. the value which occurs most frequently. Therefore, if the read-out conditions for the final readout, such as the read-out gain or the scale factor, and/or the image processing conditions are based on an analysis of the histogram of the image signal, it becomes possible to reproduce a visible image with a quality good enough that it can be used for diagnostic purposes.

In the course of radiation image recording, it is often desirable for portions of the object not related to a diagnosis or the like to be prevented from being exposed to radiation. Further, when portions of an object not related to a diagnosis or the like are exposed to radiation, the radiation is scattered by such portions to the portion that is related to a diagnosis or the like, and the image quality is adversely affected by the scattered radiation. Therefore, when a radiation image is recorded on the recording medium, an irradiation field stop is often used to limit the irradiation field to an area smaller than the overall recording region of the recording medium so that radiation is irradiated only to a specific portion of the object and a specific part of the recording medium.

However, when the image signal is detected from a recording medium, on which the irradiation field was limited during the recording of the radiation image, and the read-out conditions for the final readout and/or the image processing conditions are calculated on the basis of the results of an analysis of the image signal in the manner described above, the radiation image cannot be ascertained accurately if the image signal is analyzed without the shape and location of the irradiation field being taken into consideration. As a result, incorrect read-out conditions and/or incorrect image processing conditions are set, and a visible radiation image, which can be used for diagnostic purposes, cannot be reproduced.

In order to eliminate the aforesaid problem, it is necessary to determine the shape and location of the irradiation field and then to calculate the read-out conditions for the final readout and/or the image processing conditions on the basis of only the image signal representing image information stored in the region inside of the irradiation field.

Accordingly, the applicant has proposed in, for example, Japanese Patent Application No. 62(1987)-93633 a novel method for accurately determining the shape and location of an irradiation field even when the irradiation field has an irregular shape. The proposed method comprises the steps of detecting a contour point, which is considered to be present on the contour of the irradiation field, on each of a plurality of radial lines, each of which connects a predetermined point located in the region inside of the irradiation field with an edge of a recording medium, and determining that the region surrounded by lines connecting the thus detected contour points is the irradiation field.

In cases where contour points are detected on very many radial lines with the aforesaid method, the shape and location of the irradiation field can be determined efficiently.

However, a long time is required to detect the contour points if they are detected along a large number of lines extending radially from a predetermined point (for example, the center point of the image) located in the region inside of the irradiation field. Therefore, actually, the detecting operation is only carried out for, for example, eight or 16 contour points along eight or 16 lines.

However, in cases where a total of only eight or 16 contour points is detected, even though each of the contour points is detected accurately, it often occurs that the region surrounded by the lines connecting the contour points does not coincide with the irradiation field. In such cases, the read-out conditions for the final readout and/or the image processing conditions are set on the basis of an image signal representing image information stored in a region which does not coincide with the irradiation field. Therefore, a visible radiation image, which can be used for diagnostic purposes, cannot be reproduced even though operations for finding the shape and location of the irradiation field were carried out.

OBJECT OF THE INVENTION

In view of the aforesaid problems, the object of the present invention is to provide a method for determining the shape and location of an irradiation field wherein the shape and location of an irradiation field are found more accurately.

SUMMARY OF THE INVENTION

The present invention provides a method for determining the shape and location of an irradiation field, which comprises the steps of:

i) after an image signal which comprises a plurality of image signal components representing a radiation image is obtained from a recording medium (such as a stimulable phosphor sheet or a sheet of photographic film) on which said radiation image has been recorded in a region inside of an irradiation field, detecting a contour point of said irradiation field at the intersection of each of a plurality of radial lines, which extend from a predetermined point located in the region inside of said irradiation field on said recording medium to edges of said recording medium, and the contour of said irradiation field on the basis of the image signal components corresponding to picture elements arrayed along each said line, ii) in cases where, among the thus detected contour points, a predetermined number of the contour points consecutively arrayed along the direction of said contour, which number is not smaller than three, are present on a single straight line, shifting each of the extreme contour points, which are present at both ends of the array of the contour points present on said single straight line, to the intersection of said single straight line and a straight line on which a contour point, which is adjacent to each said extreme contour point and is not present on said single straight line, lies and which straight line intersects normal to said single straight line, and iii) determining that the region surrounded by lines connecting the thus found contour points is the irradiation field.

The expression "a predetermined number of contour points are present on a single straight line" as used herein does not necessarily mean that a predetermined number of the contour points are present exactly on a single straight line. The size of the picture elements, the accuracy of the operations and the like must be taken into consideration when it is being determined whether a group of contour points lies along a straight line.

Also, the image signal components may be proportional or inversely proportional to the amount of radiation to which the recording medium was exposed. Alternatively, the image signal components may be proportional or inversely proportional to the logarithmic value of the amount of radiation to which the recording medium was exposed. Theoretically, the irradiation field may have a variety of shapes. However, actually, the irradiation field generally has a simple shape, for example, a circular shape or a rectangular shape. Specifically, in cases where several contour points are consecutively present on a straight line, it may generally be regarded that the irradiation field has a rectangular shape (which includes a square shape). The present invention is based on such findings. With the method for determining the shape and location of an irradiation field in accordance with the present invention, in cases where a predetermined number of the contour points among the detected contour points, which number is not smaller than three, are present on a single straight line, each of the extreme contour points, which are present at both ends of the array of the contour points present on the single straight line, is shifted to the intersection of the single straight line and a straight line on which a contour point, which is adjacent to each extreme contour point and is not present on the single straight line, lies and which straight line intersects normal to the single straight line. The region surrounded by lines connecting the thus found contour points is detected as the irradiation field. Therefore, the shape and location of the irradiation field can be determined more accurately.

The predetermined number, which is not smaller than three, is selected in accordance with which point is selected as the predetermined point located in the region inside of the irradiation field, from which the radial lines extend, in accordance with the number of the radial lines, and the like. The portion of an object which was recorded, or the like, may also be taken into consideration when the predetermined number is selected.

DESCRIPTION OF THE PREFERRED EMBODIMENTS

The present invention will hereinbelow be described in further detail with reference to the accompanying drawings.

Figure 4:
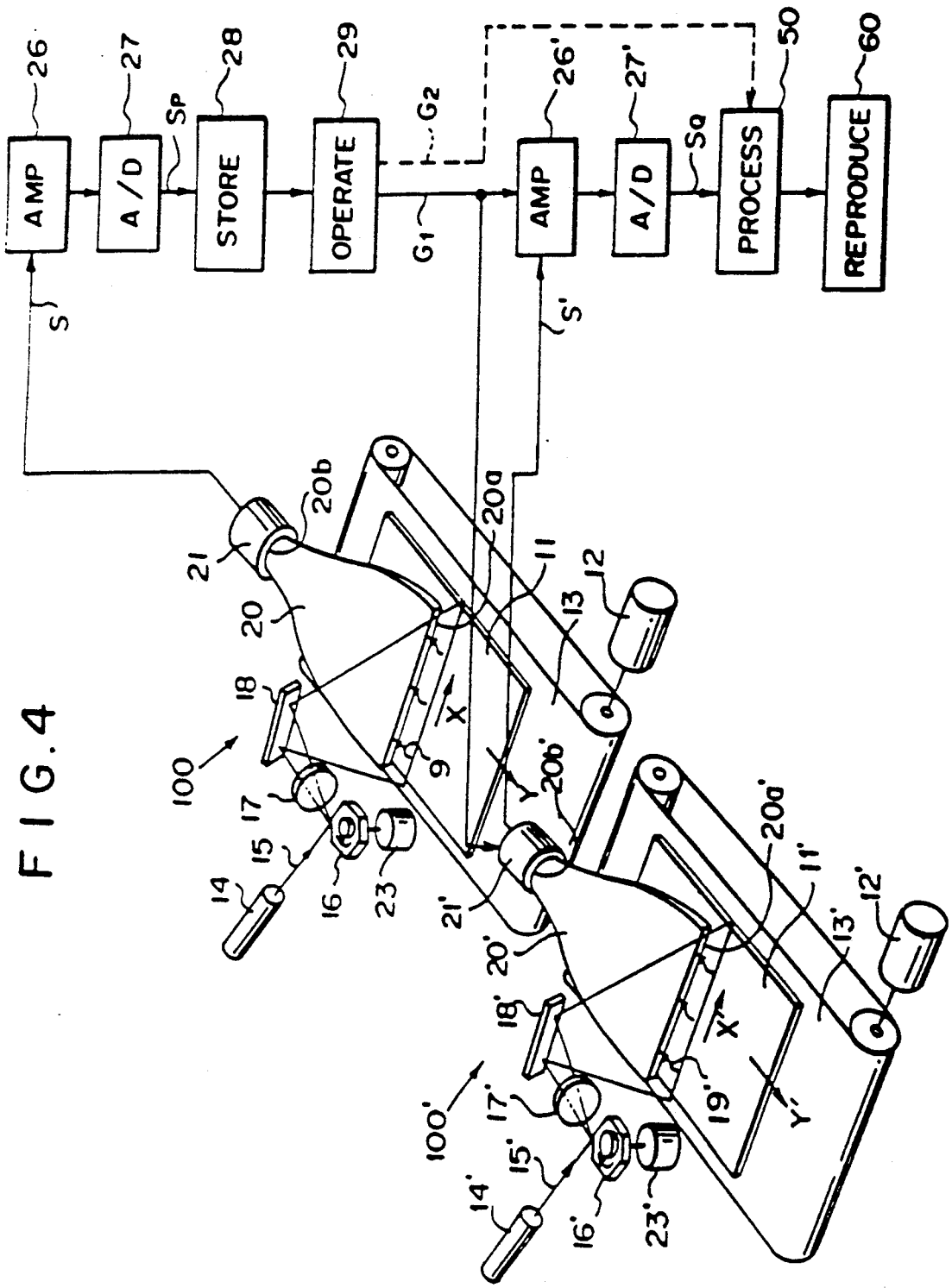
FIG. 4 is a perspective view showing an example of a radiation image read-out apparatus wherein an embodiment of the method for determining the shape and location of an irradiation field in accordance with the present invention is employed.

FIG. 4 is a perspective view showing an example of the radiation image read-out apparatus wherein an embodiment of the method for determining the shape and location of an irradiation field in accordance with the present invention is employed. In this embodiment, a stimulable phosphor sheet is utilized and a preliminary readout is carried out.

A stimulable phosphor sheet 11 on which a radiation image has been stored is placed at a predetermined position in a preliminary read-out means 100 which carries out a preliminary readout by scanning the stimulable phosphor sheet 11 with a light beam having a low energy level, thereby releasing only part of the energy from the stimulable phosphor sheet 11, which energy was stored when the stimulable phosphor sheet 11 was exposed to radiation. The stimulable phosphor sheet 11 is conveyed in a sub-scanning direction indicated by the arrow Y by a sheet conveyance means 13, which is constituted of an endless belt or the like and which is operated by a motor 12. A laser beam 15, which has a low energy level and is produced by a laser beam source 14, is reflected and deflected by a rotating polygon mirror 16, which is quickly rotated by a motor 23 in the direction indicated by the arrow, and passes through a converging lens 17 constituted of an fθ lens or the like. The direction of the optical path of the laser beam 15 is then changed by a mirror 18, and the laser beam 15 impinges upon the stimulable phosphor sheet 11 and scans it in a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20, and photoelectrically detected by a photomultiplier 21. The light guide member 20 is made from a light guiding material such as an acrylic plate, and has a linear light input face 20a positioned so that it extends along the main scanning line on the stimulable phosphor sheet 11, and a ring-shaped light output face 20b positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which amount represents the radiation image, is converted into an electric signal by the photomultiplier 21.

An analog output signal S is generated by the photomultiplier 21 and amplified by a logarithmic amplifier 26. The analog output signal S is then digitized by an A/D converter 27 into a preliminary read-out image signal SP. The preliminary read-out image signal SP has a value proportional to the logarithmic value of the amount of the emitted light 19.

In the preliminary readout, read-out conditions, such as the voltage applied to the photomultiplier 21 or the amplification factor of the logarithmic amplifier 26, are adjusted so that image information can be detected even if the amount of energy stored on the stimulable phosphor sheet 11 varies over a wide range.

The preliminary read-out image signal SP obtained in the manner described above is fed into a storage means 28 and stored therein. Thereafter, the preliminary read-out image signal SP is read from the storage means 28, and fed into an operation means 29. The operation means 29 determines the shape and location of an irradiation field on the stimulable phosphor sheet 11 on the basis of the preliminary read-out image signal SP. After determining the shape and location of the irradiation field, the operation means 29 calculates the read-out conditions G1 for the final readout, such as the voltage to be applied to a photomultiplier 21' or the amplification factor to be set in a logarithmic amplifier 26', on the basis of that part of the preliminary read-out image signal SP corresponding to the region inside of the irradiation field.

A stimulable phosphor sheet 11' on which the preliminary readout has been finished is placed at a predetermined position in the final read-out means 100' and scanned with a light beam 15' having an energy level higher than that of the light beam 15 used in the preliminary readout. In this manner, an image signal SQ is detected on the basis of the read-out conditions G1 adjusted as described above. The configuration of the final read-out means 100' is nearly the same as that of the preliminary read-out means 100, and therefore elements corresponding to those constituting the preliminary read-out means 100 are numbered with corresponding primed reference numerals in FIG. 4.

After the image signal SQ is digitized in an A/D converter 27', the image signal SQ is fed into an image processing means 50, which carries out appropriate image processing of the image signal SQ. After being image processed, the image signal is fed into a reproducing apparatus 60, which reproduces a visible image by use of the image signal. How the operation means 29 determines the shape and location of the irradiation field on the basis of the preliminary read-out image signal SP will be described hereinbelow.

Figure 1:
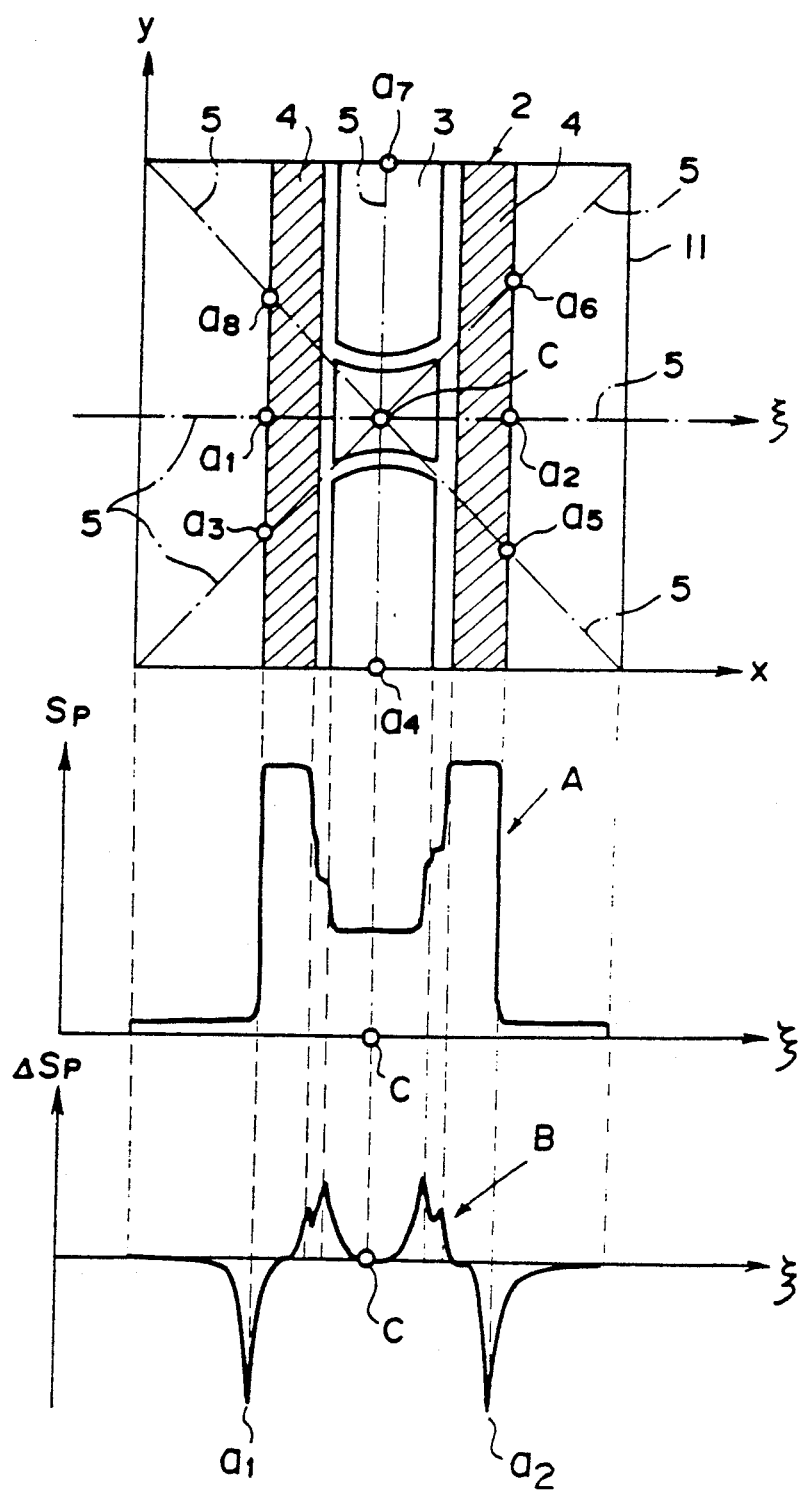
FIG. 1 is an explanatory view showing an example of a radiation image, a preliminary read-out image signal representing the radiation image, and differentiated values of the preliminary read-out image signal.

FIG. 1 shows an example of a radiation image, a preliminary read-out image signal SP representing the radiation image, and differentiated values ΔSP obtained from a differentiation processing operation performed on the preliminary read-out image signal SP.

With reference to FIG. 1, the image of an object 3 (the leg of a human body in this case) is stored in the region inside of an irradiation field 2 on the stimulable phosphor sheet 11. Also, a background region 4, upon which radiation impinged directly, is stored in the region inside of the irradiation field 2.

In this embodiment, differentiation operations are carried out on the image signal components of the preliminary read-out image signal SP corresponding to the picture elements arrayed along each of eight lines 5, 5, ... which extend radially from the center point C of the stimulable phosphor sheet 11. The point at which the corresponding value of the preliminary read-out image signal SP decreases sharply is detected as a contour point of the region which is considered to be the irradiation field.

How contour points are detected on the line (lines in both the positive and negative directions) extending along the ξ axis, will be described hereinbelow.

Curve A represents the values of the image signal components of the preliminary read-out image signal SP corresponding to the picture elements arrayed along the ξ axis.

The values of the image signal components of the preliminary read out image signal SP are largest for a background region 4 which is located inside of the irradiation field 2 and upon which radiation impinged directly. The values of the image signal components of the preliminary read-out image signal SP corresponding to the contour of the irradiation field 2 decrease sharply, and the values corresponding to the boundaries between the object image 3 and the neighboring parts of the background region 4 change sharply. Curve B represents the results of differentiation carried out on the image signal components of the preliminary read-out image signal SP represented by curve A, starting from that signal component corresponding to the center point C and continuing with signal components corresponding to positions lying in the negative direction along the u axis (i.e. leftward in FIG. 1) and in the positive direction along the ξ axis (i.e. rightward in FIG. 1).

Curve B has a major peak a1 which projects downwardly for the line extending from the center point C in the negative direction along the ξ axis. Therefore, the position corresponding to the peak a1 is detected as a contour point.

On the line extending from the center point C in the positive direction along the ξ axis, curve B has a major peak a2 which projects downwardly. Therefore, the position corresponding to the peak a2 is detected as a contour point. In the manner described above, contour points a1 through a8 are detected respectively on eight lines 5, 5, ... each of which connects the center point C with the edge of the stimulable phosphor sheet 11.

Figure 2:
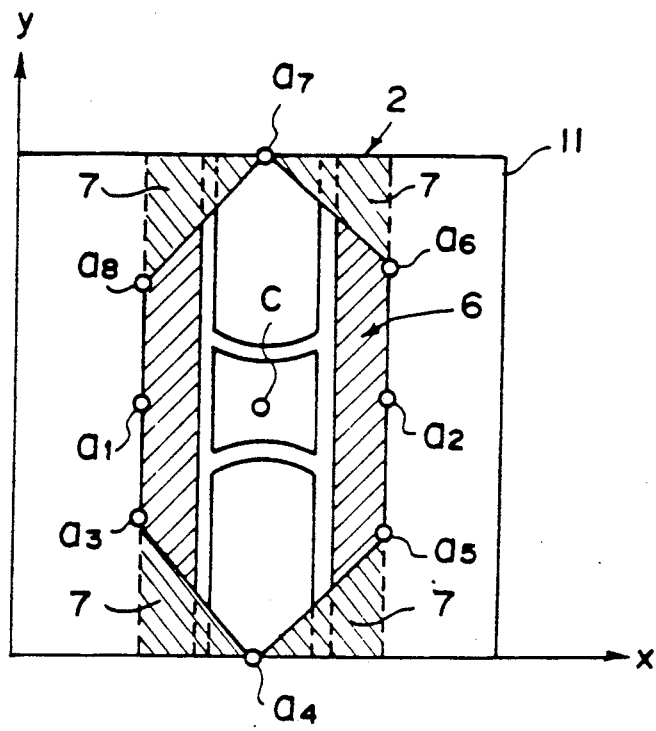
FIG. 2 is an explanatory view showing a region surrounded by lines, which connect contour points al (l=1 to 8), of the same radiation image as that shown in FIG. 1.

FIG. 2 is an explanatory view showing a region 6 surrounded by lines, which connect the contour points al (l=1 to 8) of the same radiation image as that shown in FIG. 1.

In cases where very many contour points are detected, the region surrounded by the lines connecting the contour points can be made to coincide with the irradiation field 2 with an acceptable accuracy. However, as described above, as the number of the contour points which are to be detected increases, a longer time is required to detect the contour points. Therefore, often only several contour points (for example, eight contour points as in this embodiment) are detected.

However, as shown in FIG. 2, in cases where only a small number of contour points are detected, the region surrounded by the lines connecting the contour points does not sufficiently coincide with the true irradiation field. In the example shown in FIG. 2, the irradiation field thus detected, i.e. the region surrounded by the contour points al (l=1 to 8), fails to include four triangular regions 7, 7, .... In such cases, the read-out conditions G1 for the final readout (shown in FIG. 1) are calculated with the image signal components of the preliminary read-out image signal SP corresponding to the four triangular regions 7, 7, . . . being ignored. Therefore, it often occurs that the calculated read-out conditions G1 are not appropriate.

Accordingly, the shape and location of the irradiation field are determined more accurately in the manner described below.

In this embodiment, in cases where three or more contour points are consecutively arrayed along a single straight line in the direction of a contour detected in the manner described above, operations are carried out in the manner described below.

Figure 3:
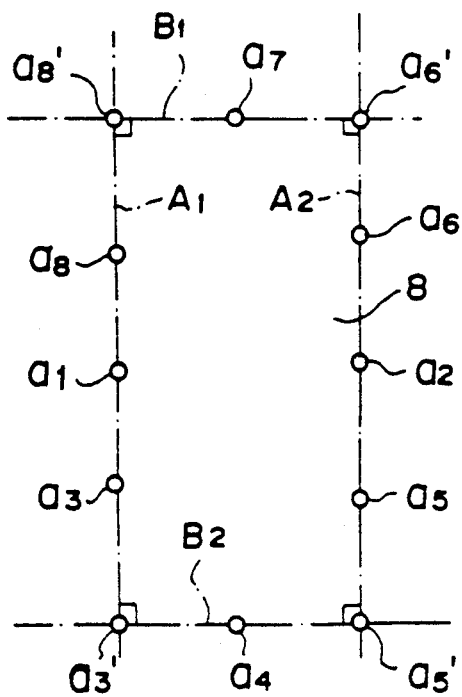
FIG. 3 is an explanatory view showing a method for more accurately determining the shape and location of an irradiation field from the detected contour points al (l=1 to 8)

FIG. 3 is an explanatory view showing a method for more accurately determining the shape and location of an irradiation field from the detected contour points.

With reference to FIG. 3, three contour points a8, a1, and a3 are arrayed on a straight line A1, and three contour points a6, a2, and a5 are arrayed on a straight line A2. Contour points a4 and a7 are located at positions which deviate from the straight lines A1 and A2. Therefore, the contour points a8 and a3, which are present at both ends of the array of the contour points present on the straight line A1, are respectively shifted to intersections a8' and a3' of the straight line A1 and straight lines B1 and B2 on which the contour points a7 and a4, which are adjacent to the contour points a8 and a3 and are not present on the straight line A1, respectively lie and which straight lines B1 and B2 intersect normal to the straight line A1. Also, the contour points a6 and a5, which are present at both ends of the array of the contour points present on the straight line A2, are respectively shifted to intersections a6' and a5' of the straight line A2 and the straight lines B1 and B2 on which the contour points a7 and a4, which are adjacent to the contour points a6 and a5 and are not present on the straight line A2, respectively lie and which straight liens B1 and B2 intersect normal to the straight line A2. A region 8 surrounded by lines connecting the thus found contour points a1, a3', a4, a5', a2, a6', a7, and a8' is detected as the irradiation field. The irradiation field (i.e. the region 8) thus detected coincides with the true irradiation field 2 shown in FIGS. 1 and 2. From the theoretical point of view, in cases where a true irradiation field 2 is, for example, triangular, errors will increase when the method for determining the shape and location of an irradiation field described above is carried out. However, in most cases, irradiation fields have a circular shape or a rectangular shape (which includes a square shape). Also, in cases where an irradiation field is circular, three or more contour points are not arrayed on a single straight line. Therefore, statistically, when the operations are carried out to correct the shape and location of the irradiation field, the shape and location of the irradiation field can be determined more accurately. How many contour points should be arrayed on a single straight line before the correction described above is carried out should be judged in accordance with the number of the contour points detected, the accuracy required, the object the image of which is recorded, the shapes of irradiation fields which are employed in the current system, and the like.

After the shape and location of the irradiation field 2 are found in the manner described above, the read-out conditions G1 for the final readout shown in FIG. 4 are adjusted on the basis of that part of the preliminary read-out image signal SP corresponding to the region inside of the irradiation field 2 so that the image signal representing the image information stored in the region inside of the irradiation field 2 is detected appropriately.

In the aforesaid embodiment, the preliminary read-out means 100 and the final read-out means 100' are separate from each other. Alternatively, because the configurations of the preliminary read-out means 100 and the final read-out means 100' are approximately identical to each other, a single read-out means may be utilized for performing both the preliminary readout and the final readout. In this case, after being subjected to the preliminary readout, the stimulable phosphor sheet 11 may be moved back to the position at which image readout is started. Thereafter, the final readout may be carried out.

In cases where a single read-out means is utilized to perform both the preliminary readout and the final readout, it is necessary to change the intensity of the light beam used in the preliminary readout and the final readout. For this purpose, various methods may be employed as described above, for example, a laser beam source or the like may change the intensity of the light beam.

In the aforesaid embodiment, the read-out conditions for the final readout are adjusted by the operation means 29. Alternatively, predetermined read-out conditions may be used when the final readout is carried out regardless of the characteristics of the preliminary read-out image signal SP. On the basis of the preliminary read-out image signal SP, the operation means 29 may select the image processing conditions G2 to be used in the image processing means 50 which carries out image processing of the image signal SQ. The image processing conditions G2 calculated by the operation means 29 may then be fed into the image processing means 50 as indicated by the broken line in FIG. 4. The operation means 29 may also adjust both the read-out conditions and the image processing conditions.

The aforesaid embodiment is applied to a radiation image read-out apparatus wherein a preliminary read-out is carried out. However, the method for determining the shape and location of an irradiation field in accordance with the present invention is also applicable to radiation image read-out apparatuses wherein no preliminary read-out operations are carried out, and only the aforesaid final read-out operations are carried out. In these cases, an image signal is obtained by use of predetermined read-out conditions. Based on the image signal, image processing conditions are calculated by an operation means. The calculated image processing conditions are taken into consideration when the image signal is processed.

The method for determining the shape and location of an irradiation field in accordance with the present invention is not limited to the aforesaid embodiment wherein a stimulable phosphor sheet is used, and is also applicable to, for example, an X-ray image read-out apparatus wherein conventional X-ray film is used.

Figure 5:
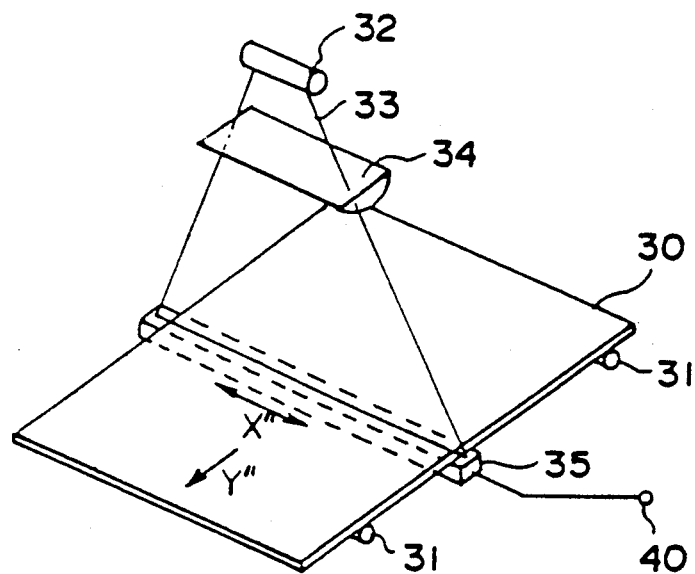
FIG. 5 is a perspective view showing an example of an X-ray image read-out apparatus wherein an X-ray image recorded on an X-ray film is read out.

FIG. 5 is a perspective view showing an example of an X-ray image read-out apparatus wherein an X-ray image recorded on an X-ray film is read out.

With reference to FIG. 5, a sheet of X-ray film 30 on which an X-ray image has been recorded, is placed at a predetermined position and is conveyed in the direction indicated by the arrow Y'' by a film conveyance means 31.

Reading light 33, which is produced by an elongated light source 32 extending in one direction, is converged by a cylindrical lens 34, and is linearly irradiated onto the X-ray film 30 in the directions indicated by the double-headed arrow X'', which are approximately normal to the direction indicated by the arrow Y''. A MOS sensor 35 is positioned below the X-ray film 30 in such a way that it can receive the reading light 33 which has passed through the X-ray film 30, the intensity of which light has been modulated in accordance with the X-ray image recorded on the X-ray film 30. The MOS sensor 35 comprises a plurality of solid state photoelectric conversion devices which are arrayed linearly at intervals equal to the intervals between the picture elements of the X-ray image in the directions indicated by the arrow X''. As long as the X-ray film 30 is conveyed in the direction indicated by the arrow Y'' while being exposed to the reading light 33, the MOS sensor 35 detects the reading light, which has passed through the X-ray film 30, at predetermined intervals corresponding to the intervals between the picture element of the X-ray image along the direction indicated by the arrow Y''.

Figure 6:
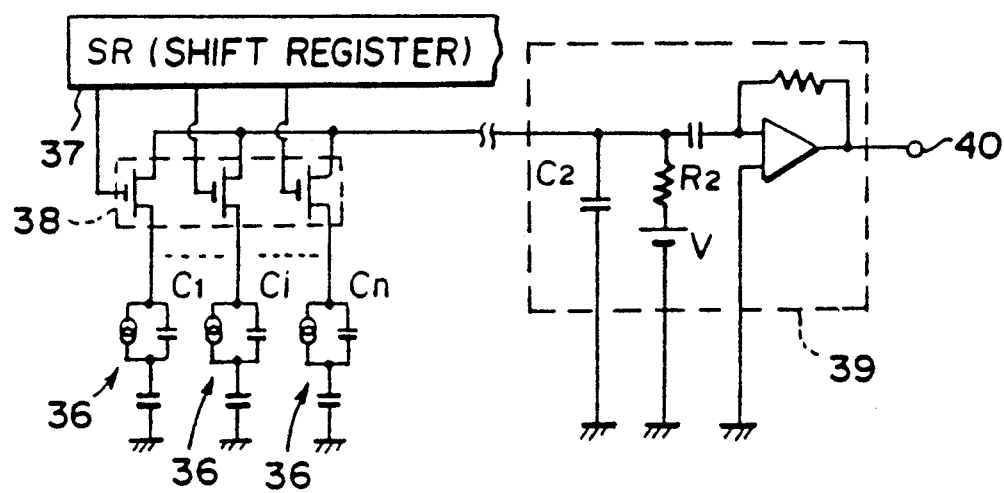
FIG. 6 is a circuit diagram showing an equivalent circuit for a MOS sensor.

FIG. 6 is a circuit diagram showing an equivalent circuit for the MOS sensor 35.

With reference to FIG. 6, photocarriers generated when the reading light 33 impinges upon the solid state photoelectric conversion devices 36, 36, . . . accumulate in capacitors $C_i$ ($i = 1, 2, \ldots, n$) of the solid state photoelectric conversion devices 36, 36, . . . . The switches of a switch section 38 are turned on and off sequentially in order to detect the number of photocarriers which accumulate in the capacitors $C_i$. A shift register 37 controls the switches of the switch section 38, and a time-serial image signal is obtained. The image signal is then amplified by a pre-amplifier 39 and exits the circuit at an output terminal 40 of the pre-amplifier 39.

The analog image signal output by the MOS sensor 35 is sampled and digitized into an image signal. Thereafter, the shape and location of the X-ray irradiation field are found in the same manner as in the aforesaid embodiment. In the embodiment shown in FIG. 5, the MOS sensor 35 may be replaced by a charge coupled device (CCD) or a charge priming device (CPD). Also, in order to read out the X-ray image from the X-ray film 30, the X-ray film 30 may be two-dimensionally scanned with a light beam in the same manner as that described above for image readout from a stimulable phosphor sheet. Furthermore, instead of light which has passed through the X-ray film 30 being detected, light reflected by the X-ray film 30 may be detected.

The method for determining the shape and location of an irradiation field in accordance with the present invention is applicable broadly when the shape and location of an irradiation field on a recording medium, on which a radiation image has been recorded in the region inside of the irradiation field, are determined on the basis of an image signal comprising a plurality of image signal components corresponding to picture elements located on the recording medium.

I claim:

1. A method for determining the shape and location of an irradiation field, which comprises the steps of:
   i) after an image signal which comprises a plurality of image signal components representing a radiation image is obtained from a recording medium on which said radiation image has been recorded in a region inside of an irradiation field, detecting a contour point of said irradiation field at the intersection of each of a plurality of radial lines, which extend from a predetermined point located in the region inside of said irradiation field on said recording medium to edges of said recording medium, and the contour of said irradiation field on the basis of the image signal components corresponding to picture elements arrayed along each said line,
   ii) in cases where, among the thus detected contour points, a predetermined number of the contour points consecutively arrayed along the direction of said contour, which number is not smaller than three, are present on a single straight line, shifting each of the extreme contour points, which are present at both ends of the array of the contour points present on said single straight line, to the intersection of said single straight line and a straight line on which a contour point, which is adjacent to each said extreme contour point and is not present on said single straight line, lies and which straight line intersects normal to said single straight line, and
   iii) determining that the region surrounded by lines connecting the thus found contour points is the irradiation field.

* * * * *